(No Model.)
A. B. OLSON.
CORN POPPER.
No. 428,626.    Patented May 27, 1890.
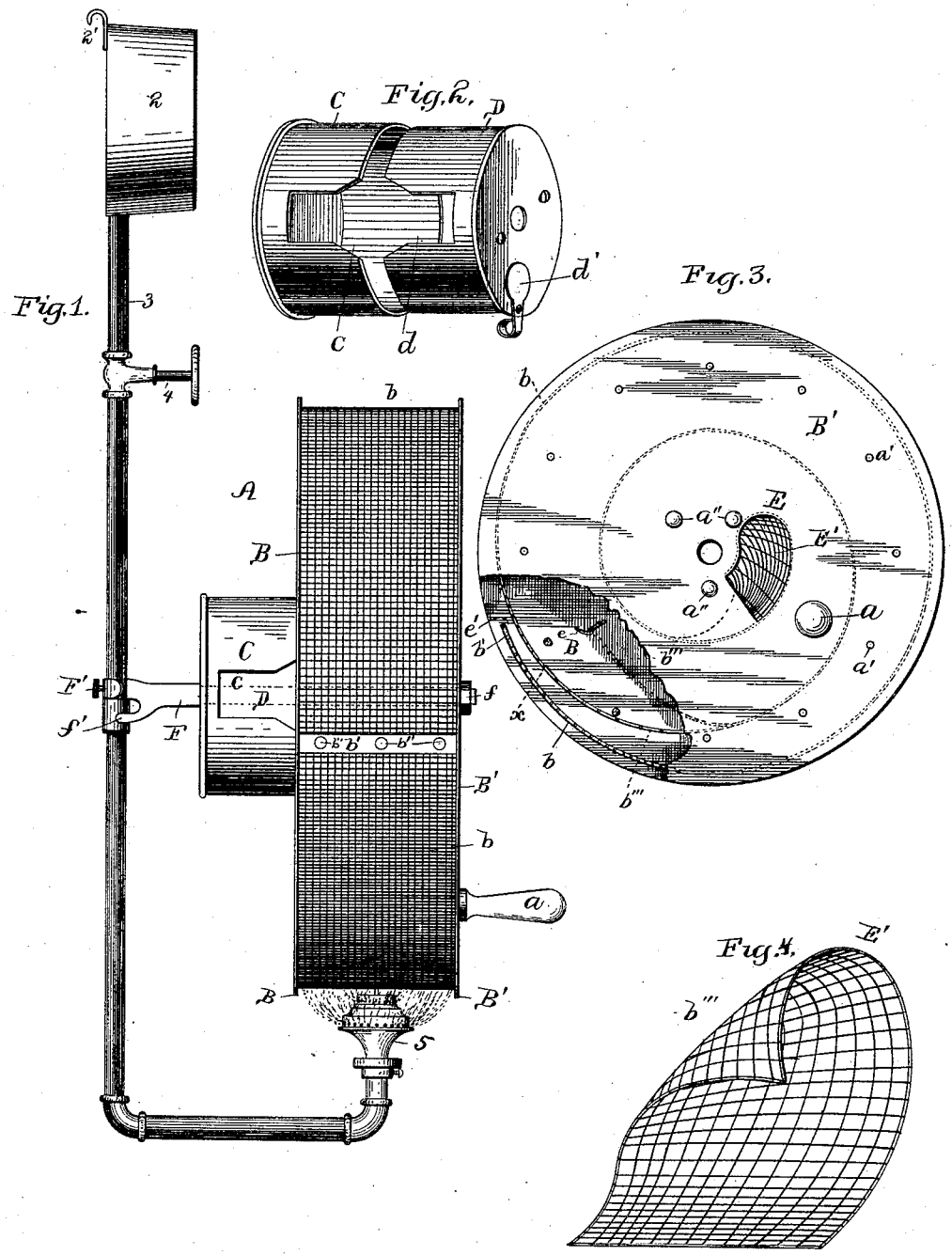
Witnesses
R. A. Balderson
James Fairfax
Inventor
Andrew B. Olson
By his Attorneys
Higdon & Higdon

ANDREW B. OLSON, OF KANSAS CITY, MISSOURI.

CORN-POPPER.

SPECIFICATION forming part of Letters Patent No. 428,626, dated May 27, 1890.

Application filed February 3, 1890. Serial No. 338,963. (No model.)

*To all whom it may concern:*

Be it known that I, ANDREW B. OLSON, of Kansas City, Jackson county, Missouri, have invented certain new and useful Improvements in Corn-Poppers, of which the following is a full, clear, and exact description, reference being had to the accompanying drawings, forming a part hereof.

My invention relates to improvements in corn-poppers, having for its object means for feeding the corn into the screens and allowing only the corn that is popped to pass out through the exit, leaving the small or unpopped grains in the outside sieve, and to accomplish these ends with simplicity and economy of construction, which I do by employing the mechanism illustrated in the accompanying drawings, in which—

Figure 1 is a side elevation of my corn-popper, showing forth the improvements. Fig. 2 is a detail in perspective of the feeding device in which the raw corn is poured. Fig. 3 is a side view of the roaster, showing the manner in which the wire screens or sieves are secured in position; and Fig. 4 is a broken-away detail in perspective, showing the wire screen suitably bent to form an exit for the corn after it is popped.

Referring to the drawings by letter, A represents my invention; B, the rear and B' the front coverings of the screen or roaster, said roaster being provided with fine wire screen $b$, which extends entirely around it in the manner illustrated in Fig. 3. C is a cup or covering, which fits over a corresponding cap D, said cups C and D being provided with openings $c$ and $d$, through which the corn may be poured. When said cup is filled, the outside cup or covering C is turned in such a manner as to inclose the corn within said cup, as illustrated in Fig. 1. The feed-hole $d'$ is then opened a sufficient distance to allow the corn to pass into the popper. $b'$ is a suitable metallic strip which secures the outer end of wire screen $b$, being provided with suitable rivets $b''$.

$b'''$ is a coarser wire screen properly secured to the fine screen $b$. The screen is secured between the coverings B and B' in the form of a spiral, the inner end being formed into a trough which conducts the corn that is popped to exit E, the shape of this exit being more clearly shown in Figs. 3 and 4. When the corn passes from the cups C and D into the roaster, it drops through the coarse screen $b'''$ onto the fine screen $b$. Then with each revolution of the roaster or popper the corn by gravity falls to the lowest point in said roaster, which is immediately above the flames which project from the burner 5, and as the corn pops it becomes too large to fall through the coarse sieve $b'''$ (when it reaches the point $x$, where they are joined) and passes out through the exit E, leaving the small unpopped grains to drop through the coarse sieve $b'''$ back to the fine sieve $b$, where it passes through the same operation as before. This is repeated until all the grains are popped.

F is a suitable axle or spindle on which the popper is secured, said spindle being provided with a hook F', by which the device may be secured to a vertical pipe or other suitable rod.

$f'$ is a brace which rests against the pipe and serves to hold the popper in position, said hook F' being so constructed that the popper may swing in any direction or may be raised or lowered to any point and secured by a suitable set-screw.

2 represents a tank, which is designed to hold a quantity of oil, gasoline, or other material which may be used with this device, said tank 2 being provided with a suitable hook 2', by which it may be hung to the wall or to any projection.

3 is the pipe, provided with a valve 4, said valve 4 being for the purpose of regulating the quantity of fluid which passes from tank 2 through pipe 3 to the burner 5.

The popper is provided with the spiral springs heretofore referred to, and where the fine screen $b$ is secured to the coarse one $b'''$ at $x$ it is so constructed that the end of screen $b'''$ may be thrown out of position, as illustrated by dotted lines in Fig. 3, and secured by suitable ratchet $e$. This makes the device suitable for roasting peanuts, chestnuts, &c. In popping corn there is always a small quantity which will not pop at all. This of course still remains in the fine screen $b$, and when it is found necessary to remove it all that is necessary is to turn the device in the reverse direction, allowing the small grains to drop out through the opening $e'$. The side coverings B and B' are secured together by suitable bolts. Handle $a$ is for operating the device.

Having thus fully described my invention, what I claim as new, and desire to secure by Letters Patent, is—

1. In a corn-popper, the circular heads B and B', an outer screen $b$ and coarser screen $b'''$, joined at $x$ and coiled into a spiral between said heads, said heads mounted on axle F, cups C and D, having openings $c$ and $d$, and a valve $d'$, which covers a perforation in cup D, substantially as described.

2. A corn-popper mounted on suitable axle F, which is provided with hook F' and brace $f'$, said popper being composed of wire screens $b$ and $b'''$, joined together in a suitable manner at the point $x$ and bent in the shape of a spiral, so that when the popper revolves all the corn which is poured is carried around said spiral and ejected through the exit E, allowing the unpopped grains to fall back through the large screen $b'''$ onto the fine screen $b$, substantially as set forth and described.

3. A corn-popper having the fine screen $b$ properly secured at the point $x$ to a coarser screen $b'''$, said coarser screen being constructed so as it may be raised out of position and secured by a suitable catch $e$ when the device is ready for use for roasting larger productions, such as peanuts, chestnuts, &c., substantially as set forth and described.

In testimony whereof I affix my signature in presence of two witnesses.

ANDREW B. OLSON.

Witnesses:
R. A. BALDERSON,
HATTIE PRICE.